(12) United States Patent
Harmon et al.

(10) Patent No.: US 9,452,667 B2
(45) Date of Patent: Sep. 27, 2016

(54) PROTECTION SYSTEMS AND METHODS FOR CARGO LOADS DURING EXPOSED AERIAL TRANSPORT

(71) Applicant: Corvid Technologies LLC, Mooresville, NC (US)

(72) Inventors: Joseph Harmon, Mooresville, NC (US); Gregory McGowan, Huntersville, NC (US)

(73) Assignee: Corvid Technologies LLC, Mooresville, NC (US)

( * ) Notice: Subject to any disclaimer, the term of this patent is extended or adjusted under 35 U.S.C. 154(b) by 106 days.

(21) Appl. No.: 14/192,453

(22) Filed: Feb. 27, 2014

(65) Prior Publication Data

US 2014/0341697 A1    Nov. 20, 2014

Related U.S. Application Data

(60) Provisional application No. 61/774,903, filed on Mar. 8, 2013.

(51) Int. Cl.
| | |
|---|---|
| *B60J 11/08* | (2006.01) |
| *B64D 9/00* | (2006.01) |
| *B60J 11/06* | (2006.01) |
| *B64D 1/22* | (2006.01) |

(52) U.S. Cl.
CPC ............. *B60J 11/08* (2013.01); *B60J 11/06* (2013.01); *B64D 1/22* (2013.01); *B64D 9/00* (2013.01); *Y02T 50/46* (2013.01)

(58) Field of Classification Search
CPC ......... B60J 11/08; B60J 11/00; B60J 1/2011; B65D 7/26; B65D 88/522; B66F 11/04; B64C 7/00; B66C 1/36

USPC ........ 296/95.1, 136.07, 136.13, 96; 280/748, 280/770; 244/137.1, 118.1, 130, 136, 137.2
See application file for complete search history.

(56) References Cited

U.S. PATENT DOCUMENTS

| | | | | |
|---|---|---|---|---|
| 1,188,185 | A | * | 6/1916 | Krulish .......................... 43/105 |
| 2,451,479 | A | * | 10/1948 | Diehl ............................ 244/130 |

(Continued)

FOREIGN PATENT DOCUMENTS

| | | |
|---|---|---|
| CN | 201325311 Y | 10/2009 |
| KR | 10-2012-0051144 | 5/2012 |

(Continued)

OTHER PUBLICATIONS

Notification of Transmittal of the International Search Report and the Written Opinion of the International Searching Authority, or the Declaration, in corresponding PCT Application No. PCT/US2014/020139 mailed Dec. 22, 2014 (14 pages).

(Continued)

*Primary Examiner* — Glenn Dayoan
*Assistant Examiner* — Sunsurraye Westbrook
(74) *Attorney, Agent, or Firm* — Myers Bigel & Sibley, P.A.

(57) ABSTRACT

A method for transporting a cargo load using a carrier aircraft includes: mounting a shield on the cargo load such that the shield is supported by the cargo load to form a protected load; and aerial transporting the protected load as a slung load from the carrier aircraft, wherein the shield serves to protect the cargo load from aerodynamic loads generated by flight of the carrier aircraft.

27 Claims, 13 Drawing Sheets

(56) References Cited

U.S. PATENT DOCUMENTS

| | | | | |
|---|---|---|---|---|
| 2,468,009 A * | 4/1949 | Bigley, Jr. | ............ | B64D 17/383 244/118.1 |
| 2,969,210 A | 1/1961 | Richardson et al. | | |
| 3,401,905 A * | 9/1968 | Rohrlick | ............ | B64D 1/02 244/137.3 |
| 3,966,144 A * | 6/1976 | Gabriel | ............ | B64D 47/00 244/17.11 |
| 4,564,161 A * | 1/1986 | Frye | ............ | 244/137.2 |
| 4,903,748 A * | 2/1990 | Foraker | ............ | 160/370.21 |
| 5,344,203 A | 9/1994 | Tollenaere | | |
| 5,356,193 A | 10/1994 | Palmer, II et al. | | |
| 5,577,687 A * | 11/1996 | Downing | ............ | 244/110 E |
| 5,738,403 A * | 4/1998 | Tyson | ............ | B60J 11/06 296/136.02 |
| 5,954,384 A | 9/1999 | Jones | | |
| 6,427,709 B1 * | 8/2002 | Montes | ............ | B60J 11/00 135/88.05 |
| 6,986,484 B2 * | 1/2006 | Scott | ............ | B64D 1/22 244/118.1 |
| 7,147,263 B2 * | 12/2006 | Schneidau | ............ | B60J 1/20 296/77.1 |
| 7,823,953 B2 | 11/2010 | Haas | | |
| 7,845,595 B2 | 12/2010 | Goddard | | |
| 7,887,011 B1 * | 2/2011 | Baldwin | ............ | 244/137.4 |
| 8,172,184 B2 | 5/2012 | Spencer et al. | | |
| 8,286,688 B2 | 10/2012 | Crozier | | |
| 8,308,223 B2 * | 11/2012 | King | ............ | B60J 5/0487 112/470.33 |
| 8,430,445 B1 * | 4/2013 | Williams | ............ | B60J 11/08 150/168 |
| 8,807,894 B2 * | 8/2014 | Bistuer | ............ | B60P 7/0876 244/118.1 |
| 2010/0263126 A1 | 10/2010 | Campani | | |

FOREIGN PATENT DOCUMENTS

| | | |
|---|---|---|
| WO | WO 02/42580 A1 | 5/2002 |
| WO | WO 02/076826 A1 | 10/2002 |

OTHER PUBLICATIONS

Protection System for Tactical Vehicles During High-Speed External Transport; URL: http://www.navysbir.com/n11 2/N112-099.htm, 2 pages.

Innovative Deployable Protection System for High-Speed External Transportation of Tactical Vehicles; URL: https://www.navysbirsearch.com/widgets/hyperlinking/autosuggest.jsp?linkpage=awarddetails.jsp&url=91DBE471-C307-40AF-89F7-846078DF77A6%7CC398DF4C-9F12-4510-83E1-E3FA4C08D4D8&id=234718&links-IFAV.LSV.VH.DRAGON&q= 1 page.

* cited by examiner

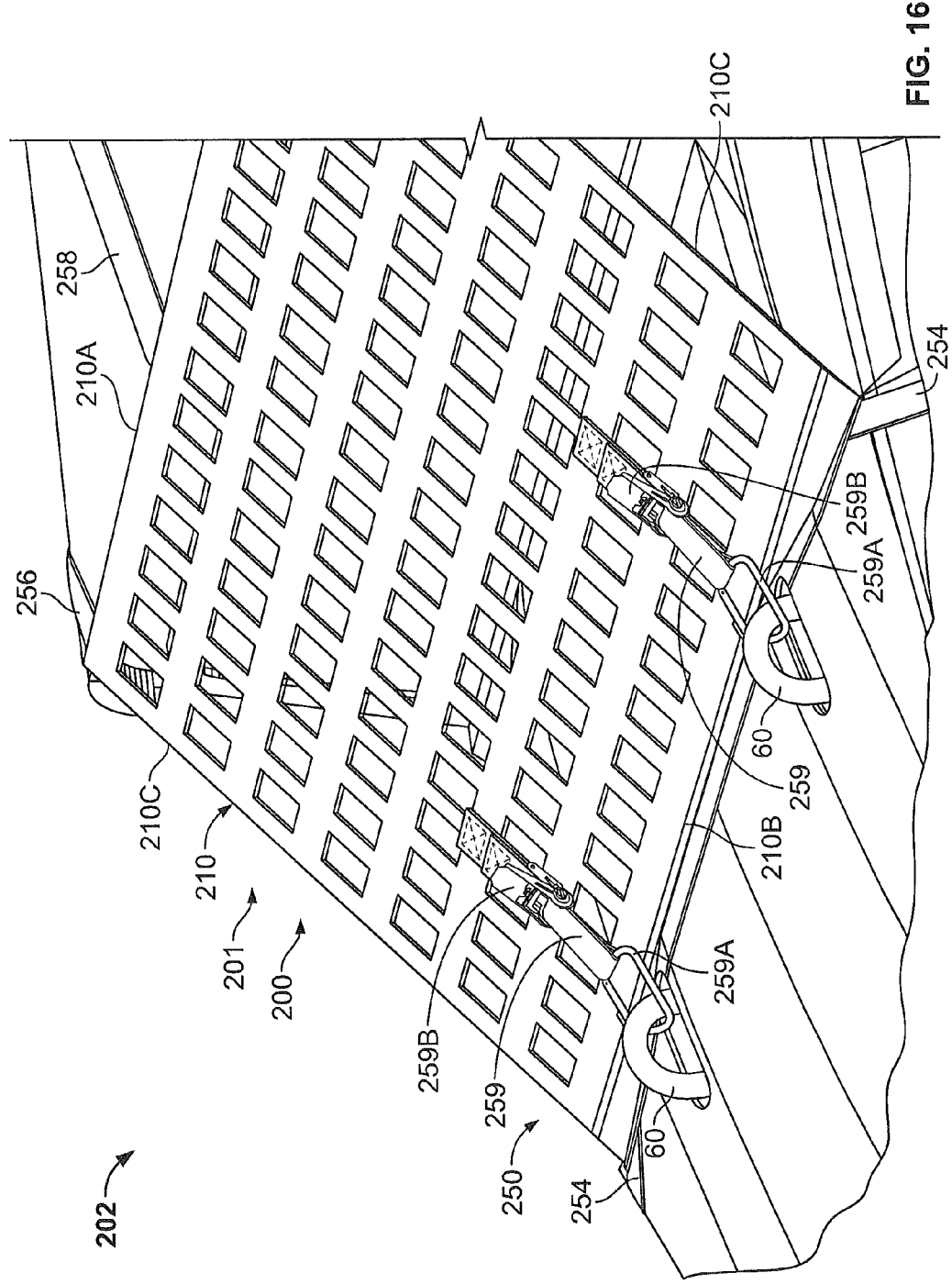

ively transported as slung loads from carrier aircraft, such as helicopters. Some carrier aircraft are capable of transporting a slung load at a higher speed than the cargo load can safely or reliably withstand. At excessive transport speeds, a high-velocity freestream air flow is incident on the cargo load and applies aerodynamic loads tending to damage the cargo load. For example, when a tactical vehicle is transported as a slung load at speeds of up to 200 knots, which is well above its rated maximum allowable forward flight speed (e.g., over 130 knots for an HMMWV), the aerodynamic loads applied to the vehicle may damage critical components. Examples of in-flight failures of this type include blown out windshields, broken hood latches (permitting the hood to fly open), and blown off hoses in the engine compartment. For this reason, transport forward flight speeds are often limited even though the carrier aircraft is capable of transporting the cargo load at a higher speed.

PROTECTION SYSTEMS AND METHODS FOR CARGO LOADS DURING EXPOSED AERIAL TRANSPORT

RELATED APPLICATION(S)

The present application claims the benefit of and priority from U.S. Provisional Patent Application Ser. No. 61/774,903, filed Mar. 8, 2013, the disclosure of which is hereby incorporated herein in its entirety.

STATEMENT OF GOVERNMENT SUPPORT

This invention was made with support under Small Business Innovation Research (SBIR) Contract No. N68335-12-C-0024 awarded by the United States Navy, Naval Air and Warfare Center. The Government has certain rights in the invention.

FIELD OF THE INVENTION

The present invention relates to aerial transport of cargo loads and, more particularly, to protective devices and methods for such cargo loads.

BACKGROUND OF THE INVENTION

Cargo loads, such as vehicles (e.g., tactical vehicles), are commonly aerially transported as slung loads from carrier aircraft, such as helicopters. Some carrier aircraft are capable of transporting a slung load at a higher speed than the cargo load can safely or reliably withstand. At excessive transport speeds, a high-velocity freestream air flow is incident on the cargo load and applies aerodynamic loads tending to damage the cargo load. For example, when a tactical vehicle is transported as a slung load at speeds of up to 200 knots, which is well above its rated maximum allowable forward flight speed (e.g., over 130 knots for an HMMWV), the aerodynamic loads applied to the vehicle may damage critical components. Examples of in-flight failures of this type include blown out windshields, broken hood latches (permitting the hood to fly open), and blown off hoses in the engine compartment. For this reason, transport forward flight speeds are often limited even though the carrier aircraft is capable of transporting the cargo load at a higher speed.

SUMMARY OF THE INVENTION

According to method embodiments of the present invention, a method for transporting a cargo load using a carrier aircraft includes: mounting a shield on the cargo load such that the shield is supported by the cargo load to form a protected load; and aerial transporting the protected load as a slung load from the carrier aircraft, wherein the shield serves to protect the cargo load from aerodynamic loads generated by flight of the carrier aircraft.

In some embodiments, the shield is flexible, and the method further includes, after aerial transporting the cargo load as a slung load: removing the shield from the cargo load; and thereafter folding, rolling and/or bundling the shield for storage.

According to some embodiments, the shield includes a section thereof perforated with a plurality of flow openings, and the shield permits a portion of the aerodynamic load generated by flight of the carrier aircraft to be applied to the cargo load through the flow openings. In some embodiments, the collective area of the plurality of openings is in the range of from about 10 to 60% of the total area of the perforated section.

According to some embodiments, the cargo load is a vehicle including a windshield, the shield includes a windshield section, and mounting the shield on the cargo load includes mounting the shield on the vehicle such that the windshield section covers and is spaced apart from the windshield to protect the windshield from aerodynamic loads generated by flight of the carrier aircraft. In some embodiments, the windshield section is flexible, and mounting the windshield section on the vehicle includes mounting the windshield section on the vehicle such that the windshield section is held in tension across and spaced apart from the windshield. In some embodiments, the windshield section is perforated with a plurality of flow openings, and the windshield section permits a tolerable portion of the aerodynamic load generated by flight of the carrier aircraft to be applied to the windshield through the flow openings. According to some embodiments, the vehicle includes a front grill, the shield includes a front bra section, and mounting the shield on the cargo load includes securing the bra section over the front grill. In some embodiments, the vehicle includes a hood, the shield includes a hood section, and mounting the shield on the cargo load includes securing the hood section over the hood.

The shield may include at least one integral grab handle.

Mounting the shield on the cargo load may include securing the shield to the cargo load using straps secured to the cargo load at selected attachment points on the cargo load. In some embodiments, the method includes applying a tension load to the shield on the cargo load using a tightening device.

According to embodiments of the present invention, a protection system for protecting a cargo load during exposed aerial transport includes a shield adapted to be mounted on the cargo load such that the shield is supported by the cargo load to form a protected load. When the protected load is aerially transported as a slung load from a carrier aircraft, the shield will serve to protect the cargo load from aerodynamic loads generated by flight of the carrier aircraft.

In some embodiments, the shield is flexible.

According to some embodiments, the shield includes a section thereof perforated with a plurality of flow openings, and the shield permits a portion of the aerodynamic load generated by flight of the carrier aircraft to be applied to the cargo load through the flow openings. In some embodiments, the collective area of the plurality of openings is in the range of from about 10 to 60% of the total area of the perforated section.

According to some embodiments, the shield includes a windshield section, and the shield is adapted to be mounted on the vehicle such that the windshield section covers and is spaced apart from a windshield of the vehicle to protect the windshield from aerodynamic loads generated by flight of the carrier aircraft. In some embodiments, the windshield section is flexible. In some embodiments, the windshield section is perforated with a plurality of flow openings, and the windshield section permits a tolerable portion of the aerodynamic load generated by flight of the carrier aircraft to be applied to the windshield through the flow openings. The shield may further include a front bra section adapted to be secured over a front grill of the vehicle. The shield may further include a hood section adapted to be secured over a hood of the vehicle.

According to some embodiments, the shield includes at least one integral grab handle.

In some embodiments, the protection system includes a plurality of straps configured to secure the shield to the cargo load at selected attachment points on the cargo load. The protection system may include at least one integral tightening device configured to apply a tension load to the shield on the cargo load.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 16 is a fragmentary, front perspective view of a protected load including a load protection system according to further embodiments of the present invention.

DETAILED DESCRIPTION OF EMBODIMENTS OF THE INVENTION

Figure 1:
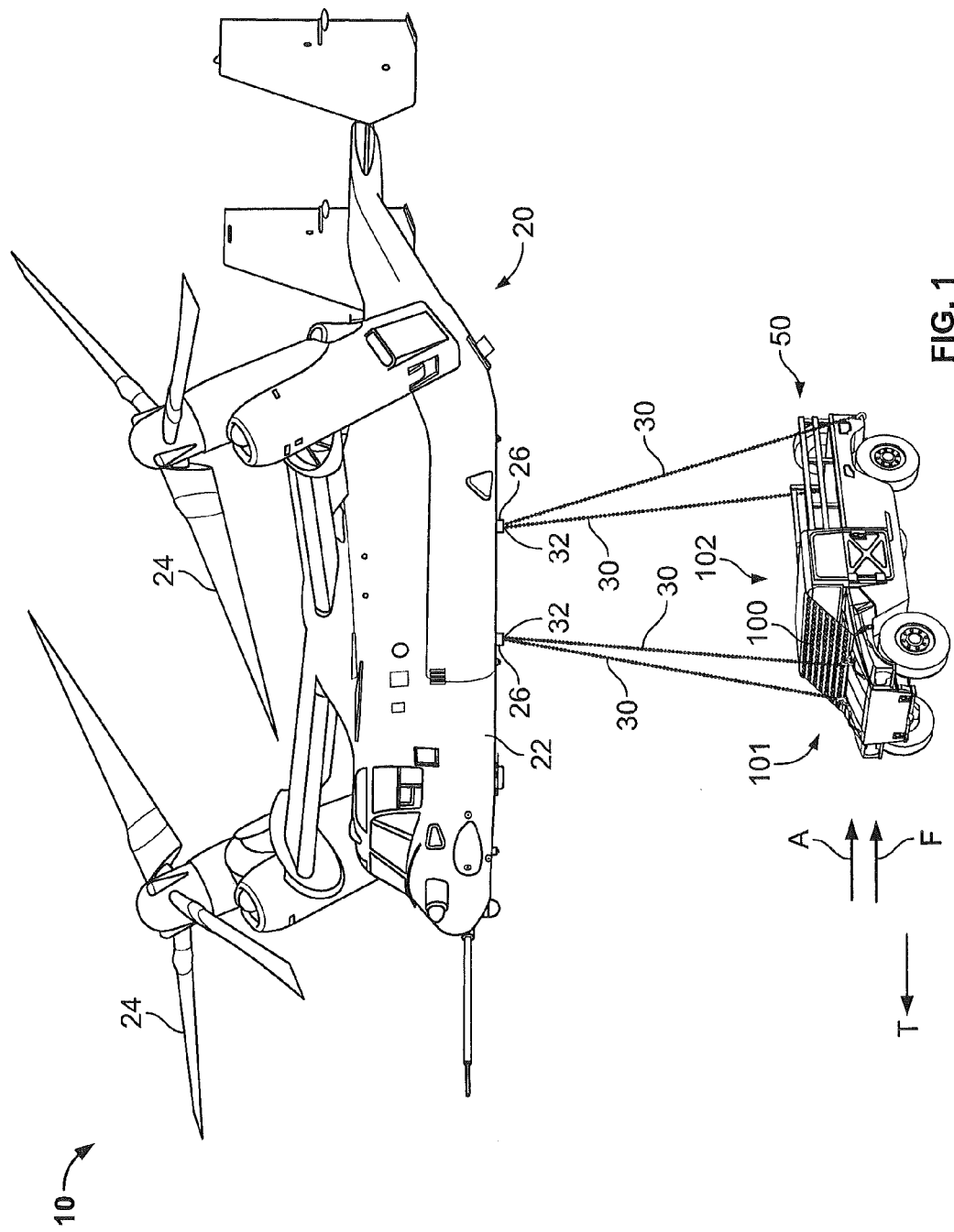
FIG. 1 is a perspective view of a transport system according to embodiments of the present invention including a protected load being transported by a carrier aircraft.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

With reference to FIG. 1, a transport system 10 according to embodiments of the invention is shown therein. The transport system 10 includes an aerial vehicle or carrier aircraft 20 and a cargo load 50 suspended from the aircraft 20 by rigging cables 30. The transport system 10 further includes a load protection system 101 according to embodiments of the invention, mounted on and supported by the cargo load 50 to form a protected load 102.

In use, and as discussed in more detail herein, the carrier aircraft 20 aerially transports the protected load 102 as a slung load 50 in a forward flight direction T so that a high velocity incident freestream air flow A is applied to or impacts the protected load 102. The air flow A generates corresponding aerodynamic loads or pressures on the protected load 102. As discussed herein, the protection system 101 serves to prevent or reduce damage to selected protected parts or regions of the cargo load 50 due to these aerodynamic loads by acting as a buffer between the high velocity freestream air flow A and the cargo load 50. According to some embodiments, the protection system 100 redirects or transfers at least a portion of the aerodynamic loads applied to the protection system to selected bracing parts of the cargo load other than the protected parts, the selected bracing parts being parts or regions that can withstand the transferred loads without significant risk of damage.

The carrier aircraft 20 may be any suitable aerial vehicle capable of effectively carrying the cargo load 50 through the air as a slung load. Examples of suitable carrier aircraft include helicopters and tiltrotor aircraft (e.g., MV-22 Osprey). According to some embodiments, the carrier aircraft 20 is capable of transporting the protected load 102 as a slung load in the forward direction T at a speed of at least about 130 knots and, in some embodiments, at least about 200 knots. The exemplary carrier aircraft 20 includes a fuselage 22, one or more propulsion mechanisms (e.g., propellers) 24, and rigging attachment features 26 (e.g., rings and/or winches).

The rigging cables 30 may be any elongate elements suitable for carrying the protected load 102 when subjected to aerodynamic loads and other forces experienced in transport. According to some embodiments, the rigging cables 30 are flexible steel cables and/or chains. Each cable 30 is provided with a mounting connector 32 secured to each end thereof. The mounting connectors 32 at the upper ends of the cables 30 are secured to the mounting features 26. The mounting connectors 32 may be, for example, self-locking eye hooks.

Figure 7:
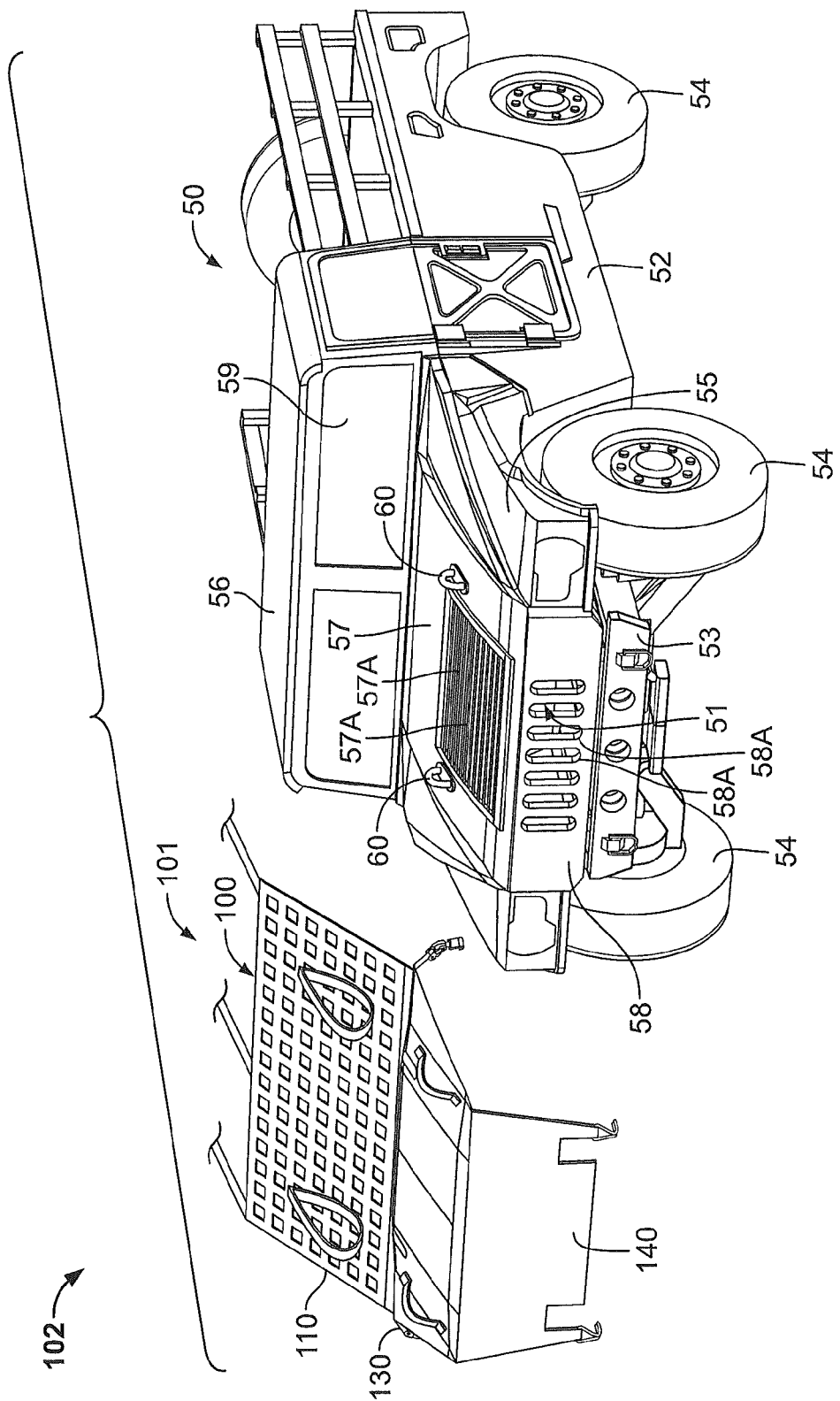
FIG. 7 is an exploded, perspective view of the protected load of FIG. 1.
Figure 8:
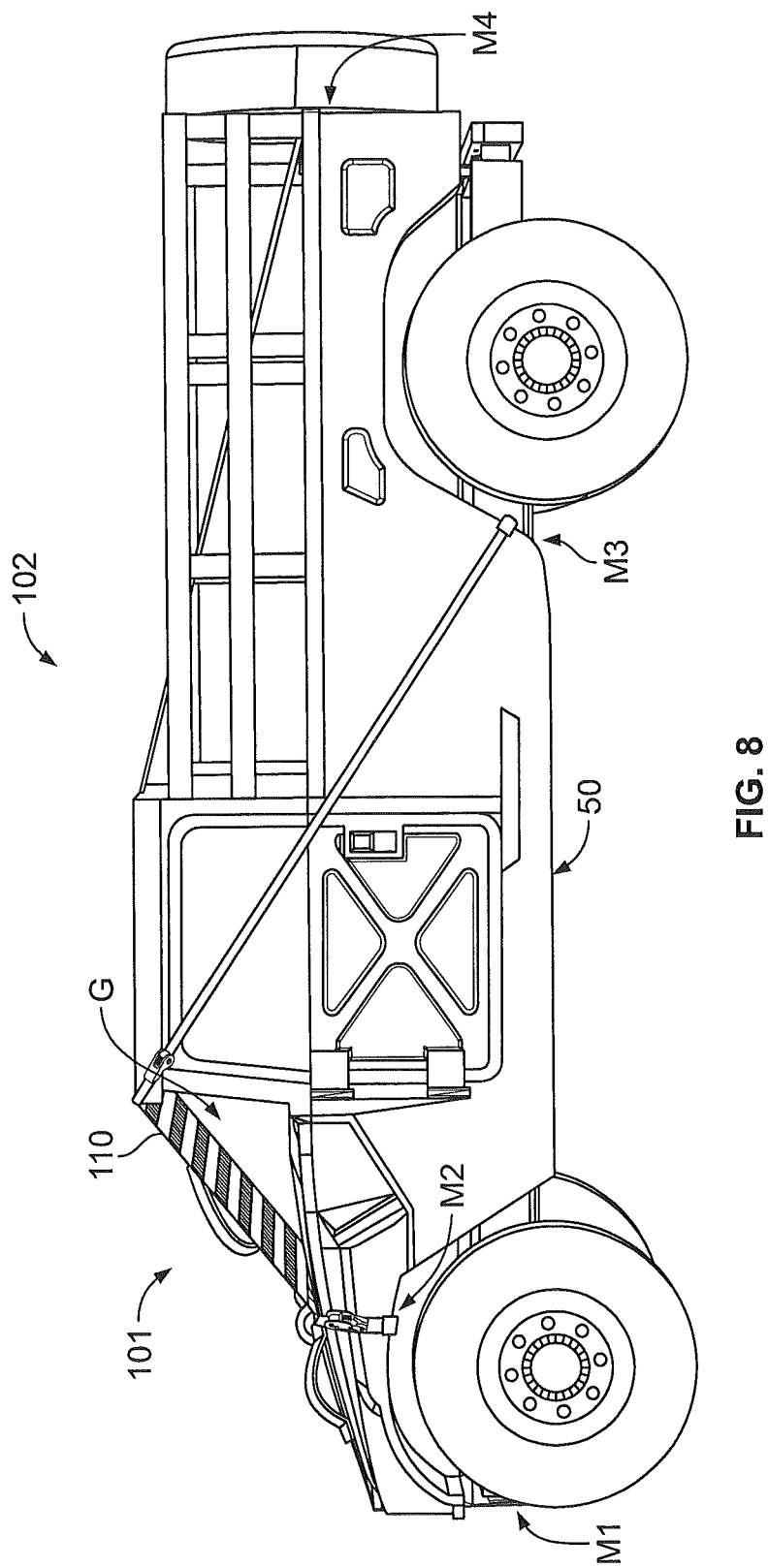
FIG. 8 is a side elevational view of the protected load of FIG. 1.

With reference to FIG. 7, according to some embodiments and as shown, the cargo load 50 is a vehicle having a rigid frame or body 52 and conveyors such as wheels 54 (as shown) or tracks. The body 52 includes a cab 56. A windshield 59 is mounted in the body 52 to shield the interior of the cab 56. The windshield 59 may be formed of glass, polycarbonate, or a glass/polycarbonate laminate, for example. The vehicle 50 may include a hood panel 57 mounted on the body 52 so as to permit the hood panel 57 to be removed or pivoted away from the body 52 for access to an underlying compartment (e.g., an engine compartment 51). The hood panel 57 may include louvered openings 57A that allow air flow into and out of the engine compartment 51. The vehicle 50 may include a front grill 58 having openings 58A (e.g., louvered openings) fluidly communicating with an underhood compartment. Mounting connector features such as lifting eyes or mounting rings 60 may be securely anchored to the body 52 between the windshield 59 and the hood panel 57 and on the bumper 53, for example. In use, the mounting connectors 32 on the lower ends of the cables 30 may be interlocked with the mounting rings 60.

According to some embodiments, the vehicle 50 is a military tactical vehicle, which may include a High Mobility Multipurpose Wheeled Vehicle (HMMWV), an Interim Fast Attack Vehicle (IFAV), and a Light Strike Vehicle (LSV).

Figure 2:
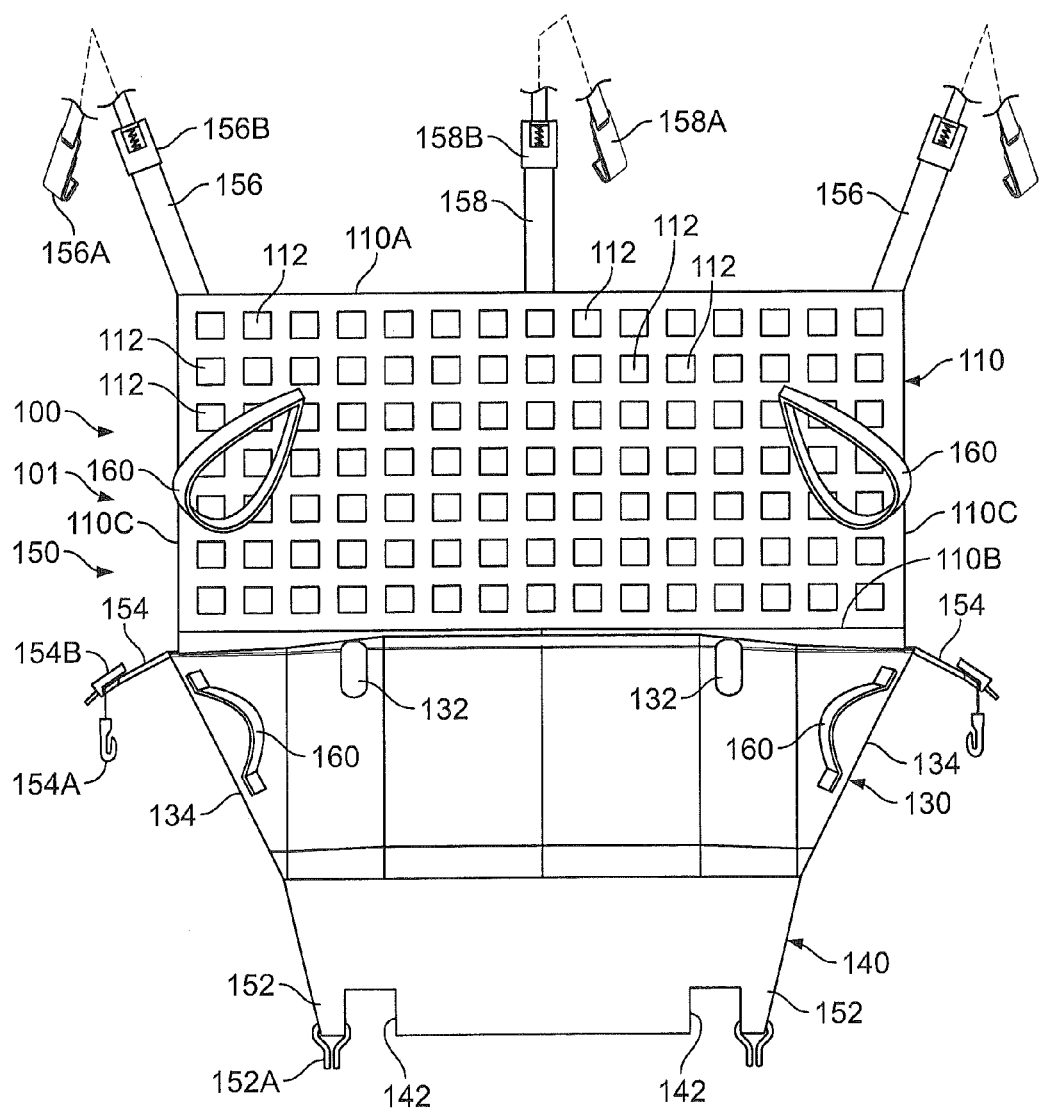
FIG. 2 is top plan view of a load protection system forming a part of the protected load of FIG. 1 according to embodiments of the invention.

The protection system 101 (FIG. 2) includes a shield 100 and a shield securement or mounting system 150.

The shield 100 includes a windshield section 110, a hood section 130, and a front bra section 140. According to some embodiments and as shown, the sections 110, 130, 140 are connected directly to one another edge-to-edge. However, in other embodiments, one or more of the sections 110, 130, 140 may be separate and unconnected to the others or may be connected by straps or the like. In some embodiments (not shown), the hood section 130 and/or the front bra section 140 may be omitted.

The windshield section 110 is a porous, flexible panel having a generally horizontally extending top edge portion 110A, a generally horizontally extending bottom edge portion 110B, and generally vertically extending opposed side edge portions 110C. A plurality of flow through openings 112 are defined in the windshield section 110. The windshield section 110 thus has the form of a net or mesh.

In some embodiments, the openings 112 are substantially evenly distributed across the width and height of the windshield section 110. According to some embodiments, the collective area of the openings 112 is in the range of from about 10 and 60% of the total area bounded by the edges 110A-C and, in some embodiments, is in the range of from about 25 to 30% of the total area bounded by the edges 110A-C. According to some embodiments, each opening 112 has an area in the range of from about 260 to 1560 square inches and, in some embodiments, from about 650 to 780 square inches.

Figure 3:
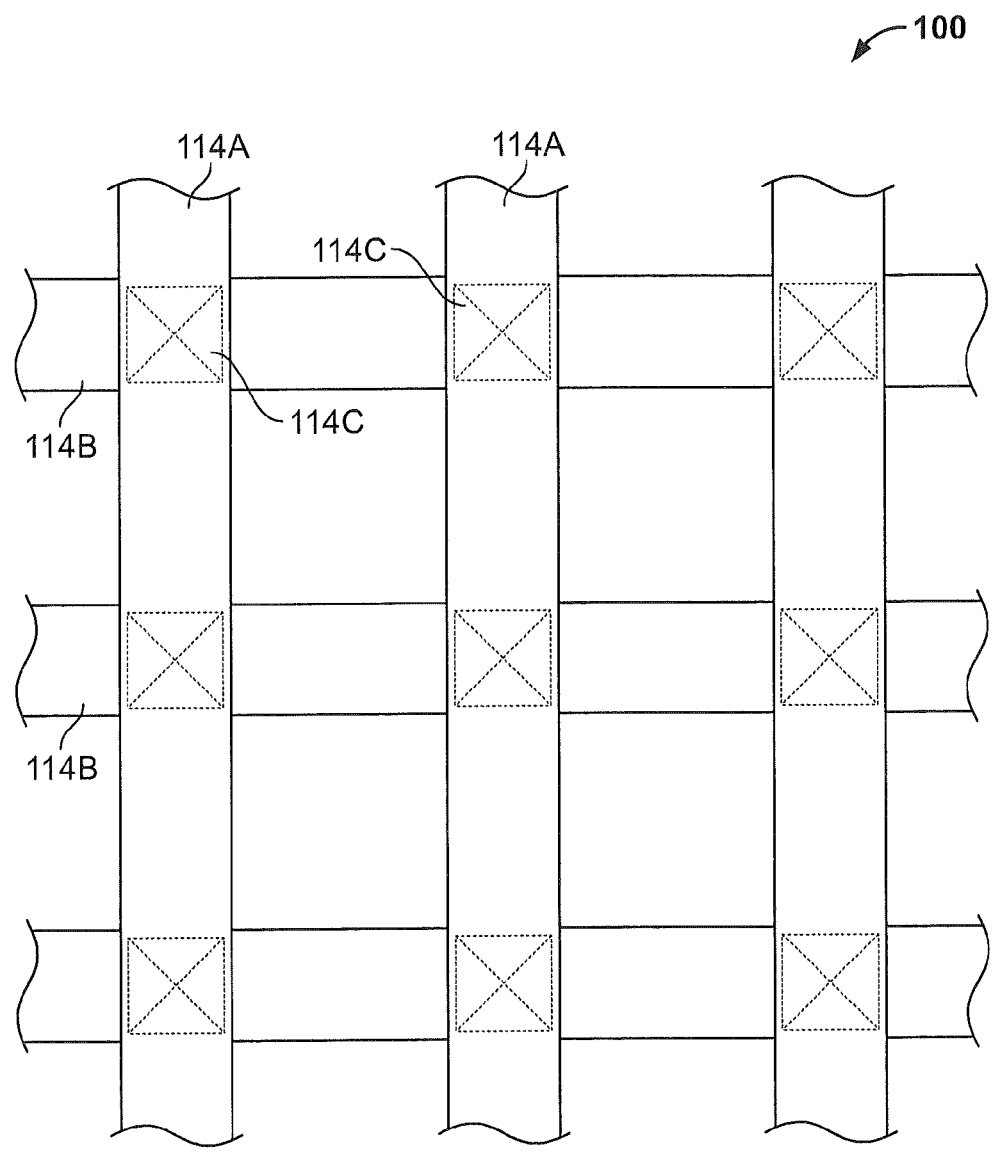
FIG. 3 is an enlarged, fragmentary view of a shield forming a part of the load protection system of FIG. 2.

According to some embodiments, the windshield section 110 is formed of a flexible, pliable, compliant material. According to some embodiments, the windshield section 110 is formed of a fabric (e.g., woven or nonwoven fabric) or relatively thick film layer (e.g., an extruded polymeric film) or multi-ply film laminate. Suitable materials may include polymeric (e.g., nylon), fabrics or films and natural fiber (e.g., cotton or hemp) fabrics. The windshield section 110 may have a multi-layer or laminate structure or may include a base layer and a reinforcing substrate (e.g., cording). The openings 112 may be formed as holes in an otherwise continuous sheet, or may be defined by transversely crossing webs, for example. In some embodiments and as illustrated in FIG. 3, the windshield section 110 is formed by a plurality of vertically extending straps or webs 114A and a plurality of horizontally extending straps or webs 114B connected by stitching 114C at their points of intersection or cross-over.

According to some embodiments, the windshield section 110 has a thickness E (FIG. 15) of no more than about 0.046 inch and, in some embodiments, in the range of from about 0.030 to 0.100 inch.

According to some embodiments, the windshield section 110 has a tensile strength of at least about 15,000 psi and, in some embodiments, in the range of from about 5,000 to 30,000 psi.

In some embodiments, the width of the windshield section 110 is at least great enough to span the width of the windshield 59. The height of the windshield section 110 may be somewhat greater than the height of the windshield 59 to enable the windshield section 110 to be spaced from the windshield as discussed below.

The hood section 130 may be formed in the same manner and of the same materials as described above for the windshield section 110. The hood section 130 may or may not (as illustrated) be provided with through holes or openings. The hood section 130 is generally shaped to cover the hood panel 57. Rigging cutouts 132 may be provided in the hood section 130 to receive the hood mount rings 60 therethrough. Fender contours or cutouts 134 are provided on opposed lateral sides of the hood section 130 to accommodate the fenders 55 of the vehicle 50.

The front bra section 140 may be formed in the same manner and of the same materials as described above for the windshield section 110. Rigging cutouts 142 may be provided in the front bra section 140 to receive the lower mount rings 60 therethrough. The bra section 140 may or may not (as illustrated) be provided with through holes or openings corresponding to the openings 112. The bra section 140 is generally shaped to cover the front grill 58.

In some embodiments, the shield 100 is provided with integral grab handles 160. The handles 160 may be constructed as flexible straps sewn or otherwise secured to the shield 100. In some embodiments, the handles 160 are provided on the windshield section 110 and/or the hood section 130.

Figure 4:
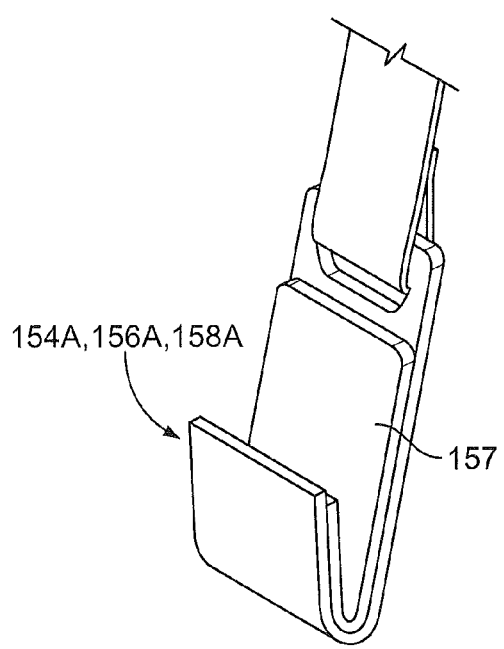
FIGS. 4 and 5 are perspective views of attachment hooks each forming a part of the load protection system of FIG. 2.
Figure 5:
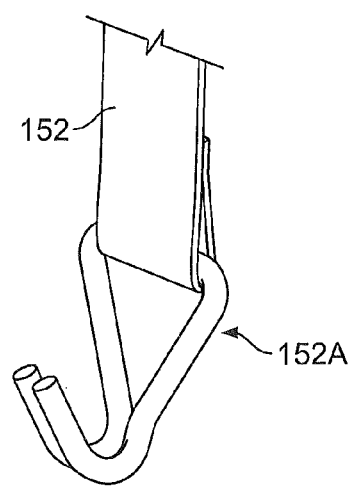
Figure 6:
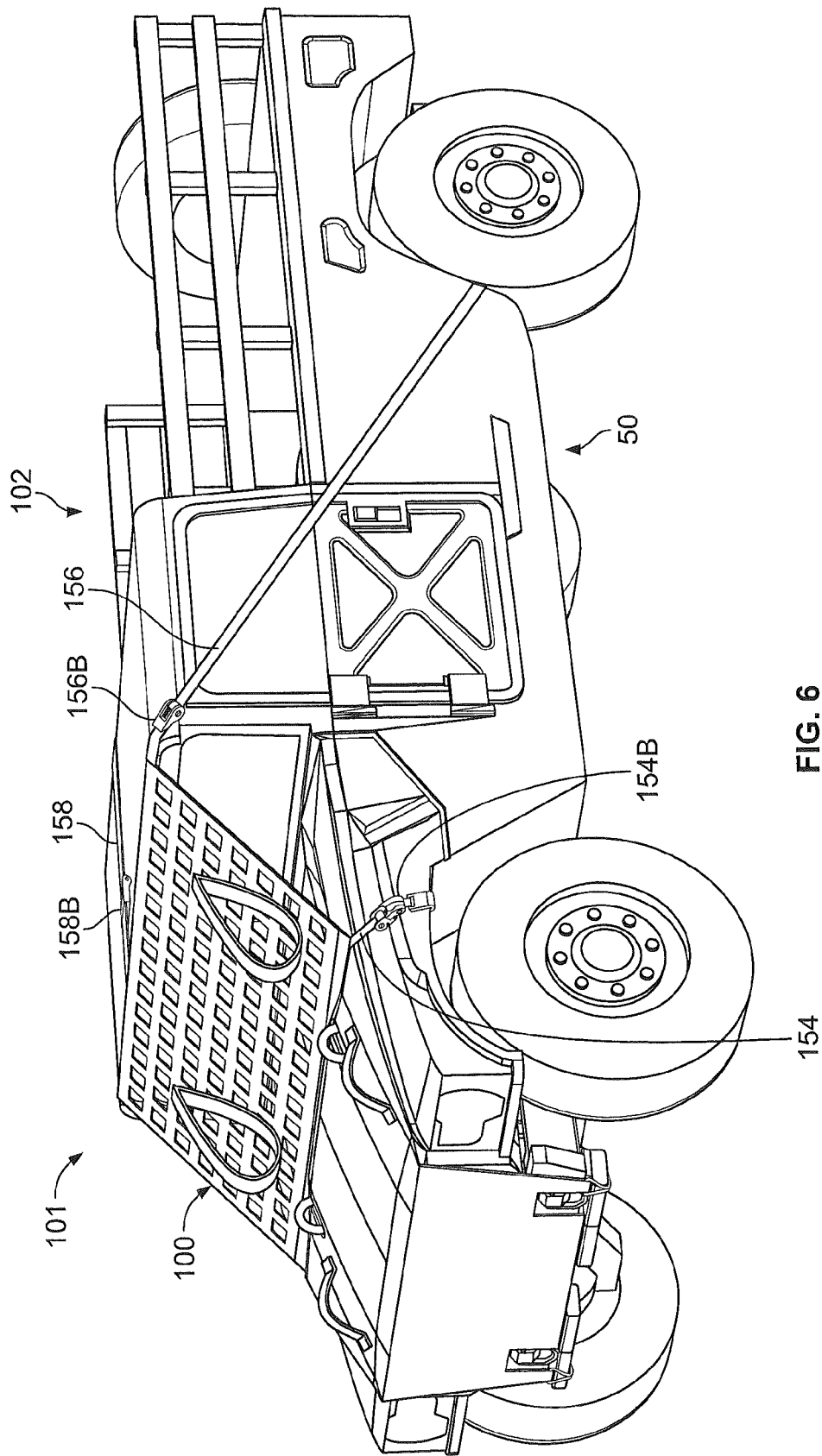
FIG. 6 is a perspective view of the protected load of FIG. 1.
Figure 10:
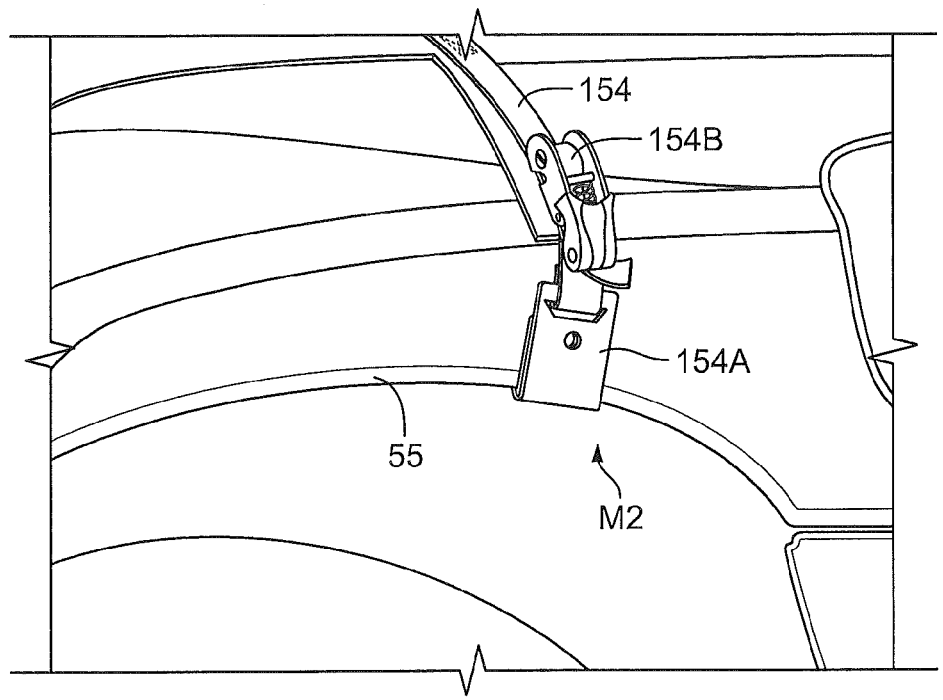
Figure 11:
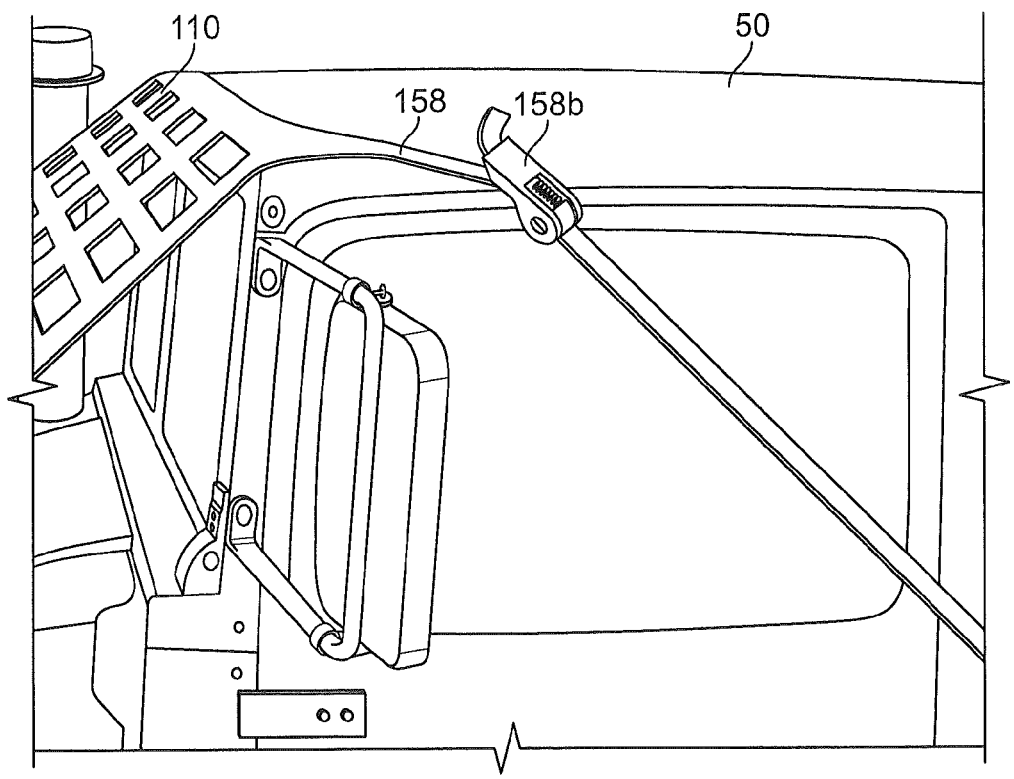

The mounting system 150 includes a pair of front straps 152, a pair of hood straps 154, a pair of rear side straps 156, and a rear center strap 158. The proximal ends of the straps 152 are secured to the front bra section 140, the proximal ends of the straps 154 are secured to the hood section 130, and the proximal ends of the straps 156, 158 are secured to the windshield section 110. The straps 152, 154, 156, 158 may be secured to the corresponding shield sections by stitching or may be integrally formed with the shield sections, for example. The distal ends of the straps 152, 154, 156, 158 are provided with hooks 152A, 154A, 156A, 158A (FIGS. 4 and 5) or other suitable connectors. The hooks 152A, 154A, 156A, 158A may be provided with resilient engagement inserts 157 such as a layer of rubber or foam rubber. The straps 154, 156, 158 are further provided with integral tightening devices 154B, 156B, 158B (FIGS. 10 and 11) such as ratcheting devices, as illustrated.

The protection system 101 may be used as follows in accordance with method embodiments of the invention. The shield 100 is unfolded as needed and laid over the vehicle 50 with the windshield section 110 generally overlying the windshield 59, the hood section 130 generally overlying the hood 57, and the front bra section 140 generally overlying the grill 58.

Figure 12:
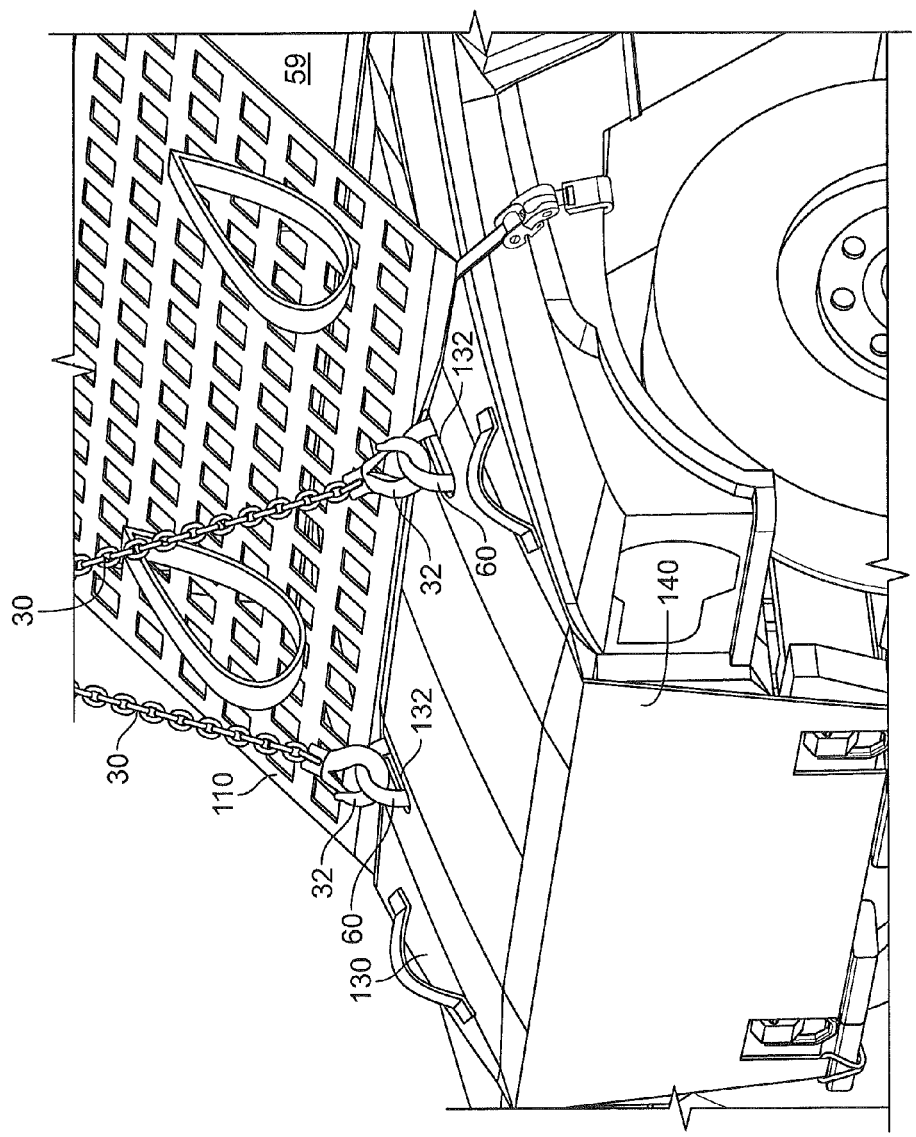

The attachment rings 60 are inserted through the rigging cutaways 132 and the mounting connectors 32 on the lower ends of the front cables 30 are secured to the rings 60 as shown in FIG. 12. The hood section 130 can serve as an access platform to provide a location or access for the ground crew to stand on the hood 57 during the rigging procedure.

Figure 9:
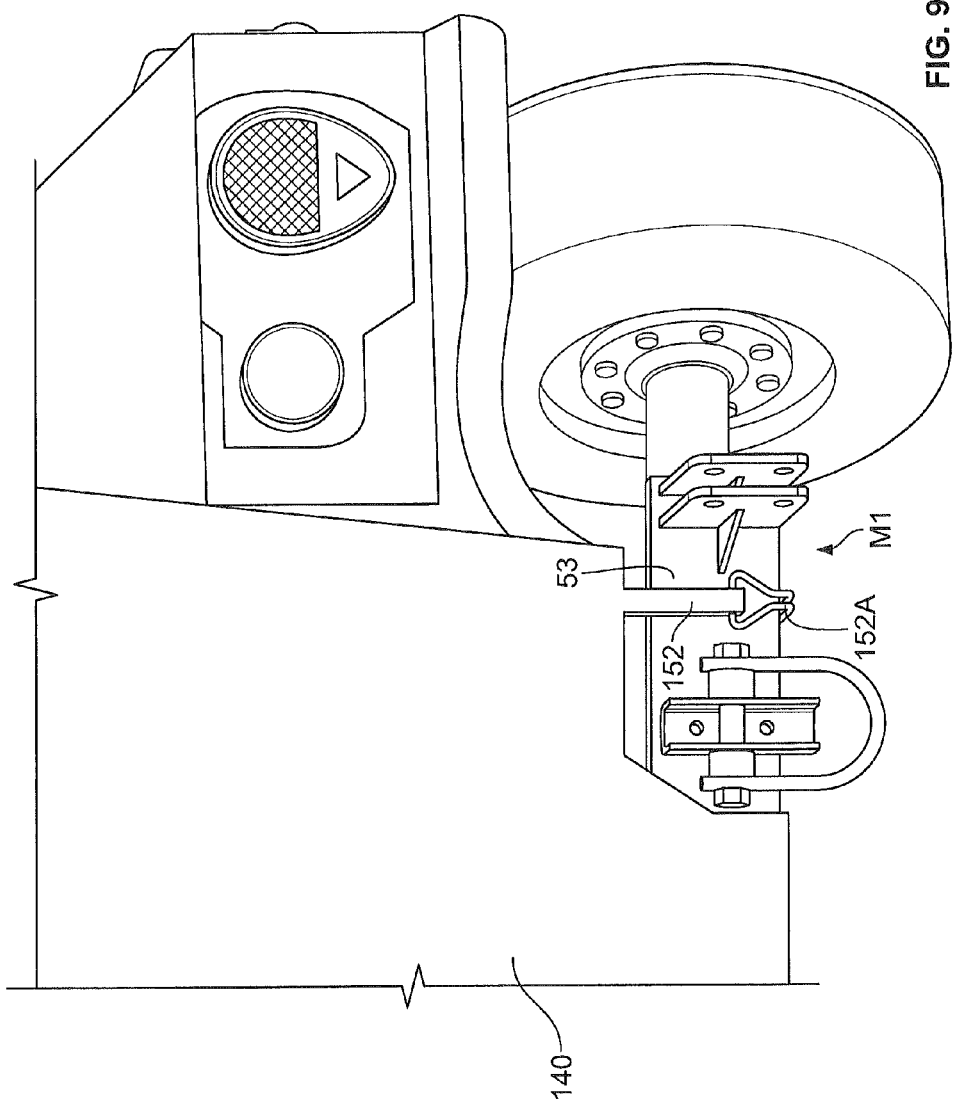
FIGS. 9-12 are enlarged, fragmentary, perspective views of the protected load of FIG. 1 showing attachments between the load protection system and a vehicle forming part of the protected load.

The hooks 152A are interlocked with the front bumper 53 (FIG. 9) attachment points M1. The hooks 154A are interlocked with the edges of the fenders 55 (FIG. 10) at attachment points M2. The hooks 156A, 158A are likewise interlocked with structures of the vehicle 50 behind the windshield 59 at attachment points M3 and M4. The straps 152-158, and thereby the shield 100, are then pulled tight into tension using the tightening devices 154B, 156B, 158B. According to some embodiments, the tension load applied across the windshield section 110 by the mounting system 150 is at least 50 lbs and, in some embodiments, is in the range of from about 75 to 200 lbs.

As best seen in FIGS. 6, 8, 11 and 15, as a result of the configuration of the shield 100 and the selection of the distributed attachment points, the windshield section 110 is placed in tension such that it spans the windshield 59 while remaining spaced apart from and out of contact with the windshield 59 by a spacing gap G.

After the protection system 101 is mounted as described, the protected vehicle 102 is transported as a slung load from the carrier aircraft 20 (e.g., in conventional manner). As the aircraft 20 carries the vehicle 50 in the forward direction T, a high-velocity freestream air flow A (FIGS. 1 and 15) impinges on the protected vehicle 102 and applies corresponding aerodynamic load F to the protected vehicle 102. According to some embodiments, the speed of the freestream air flow A encountered by the protected vehicle 50 is at least 50 knots, and in some embodiments, in the range of from about 130 to 200 knots.

The shield 100 serves as an efficient aerodynamic shield for the vehicle 50 by acting as a buffer between the high velocity freestream air flow A and portions of the vehicle 50. In particular, the shield 100 may serve as a buffer between the freestream air flow A and certain critical components such as the windshield 59 and underhood components (e.g., hoses). In this manner, the shield 100 protects the portions of the vehicle 50 from aerodynamic loads generated by flight of the carrier aircraft. It will be appreciated that the shield 100 may not deflect all of these aerodynamic loads from the protected components, but may instead reduce (but not entirely eliminate) the aerodynamic loading on the protected components.

The protection system 101 may also provide a moderate reduction in drag on the slung load. This drag reduction benefits the aircraft 20 as less power is required to maintain a given forward flight speed.

Figure 15:
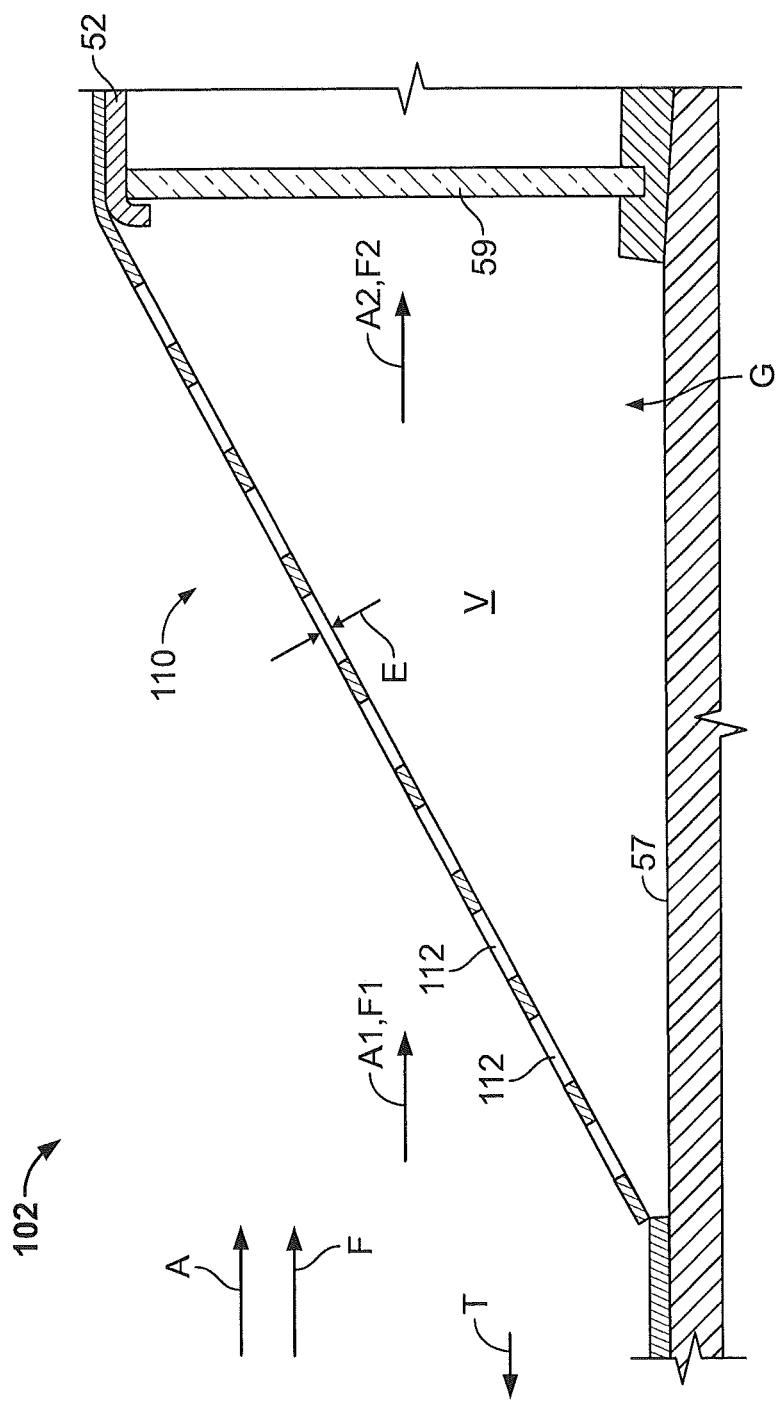
FIG. 15 is a fragmentary, cross-sectional view of the protected load of FIG. 1 illustrating air flow and aerodynamic forces applied to the protected load in flight.

With reference to FIG. 15, the windshield section 110 receives at least a portion A1 of the freestream air flow A that would, in the absence of the shield 100, impact the windshield 59 and deflects the freestream air flow portion A1 away. Because the windshield section 110 is spaced apart from the windshield 59, the windshield section 110 transfers the aerodynamic load F from the air flow portion A1 to the frame 52 via the attachment points M1, M2, M3, M4, rather than to the windshield 59. The resulting pressure drop behind the buffering windshield section 110 can greatly reduce the forces experienced by the windshield 59.

A further portion A2 of the freestream air flow A is permitted to flow through the openings 112 and into the volume V defined between the windshield 59 and the windshield section 110. An aerodynamic load F2 from the freestream air flow portion A2 is thereby applied to the windshield 59 rather than the windshield section 110. The force F2 associated with the air flow portion A2 may be substantially diminished by the geometries of the openings 112 so that the aerodynamic load F2 may be less than proportional to the collective area of the openings 112. According to some embodiments, the windshield section 110 and the openings 112 are configured such that under the prescribed or anticipated operating conditions, the aerodynamic load F2 is less than a prescribed threshold load value at which the windshield 59 would or may be damaged by the aerodynamic load.

As will be appreciated from the foregoing discussion, the openings 112 or porosity of the windshield section 110 cause the aerodynamic load F to be shared between the windshield section 110 and the windshield 59. While a solid panel could be used to transfer the entire aerodynamic load, the described arrangement can provide significant advantages. Because the windshield section 110 bears a reduced aerodynamic load, it can be made with less or lighter material, providing an overall lighter and/or lower volume shield 100. The material removed or omitted for the openings 112 can likewise provide an overall lighter shield 110. Also, because the windshield section 110 bears a reduced aerodynamic load, the structural requirements of the materials and fasteners of the protection system 101 as well as the structural requirements of the supporting structures (e.g., the attachment points on the frame 52) can be commensurately reduced.

The front bra section 140 covers the openings 58A of the grill 58, which ordinarily would allow high-velocity air to penetrate into the underhood area of the vehicle 50. The front bra section 140 deflects the freestream air flow A and thereby restricts the amount of air entering through these openings, thereby reducing loads experienced on underhood components. The hood section 130 may also serve to protect underbody components. Alternatively, the hood section 130 and/or the front bra section 140 may be porous or provided with through passage openings corresponding to the openings 112.

Figure 13:
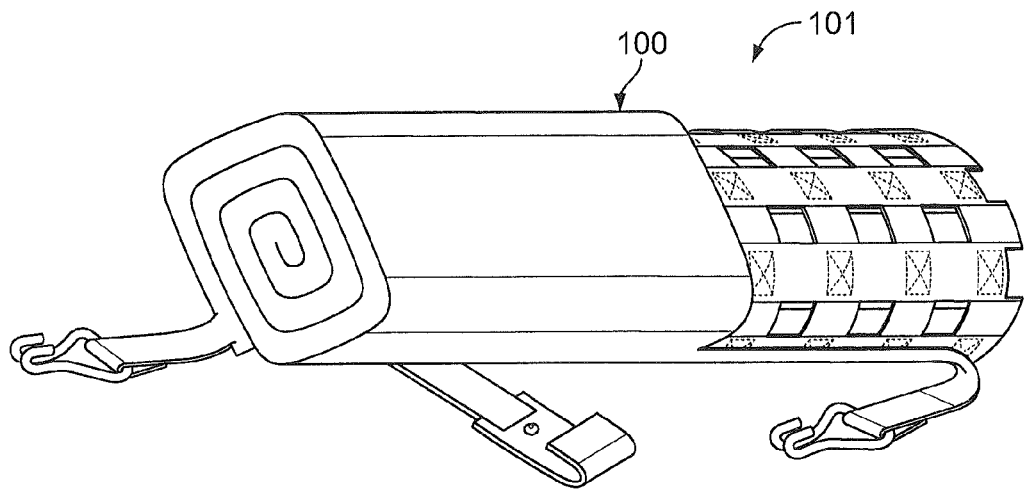
FIGS. 13 and 14 are perspective views of the load protection system of FIG. 2 in a storage position.
Figure 14:
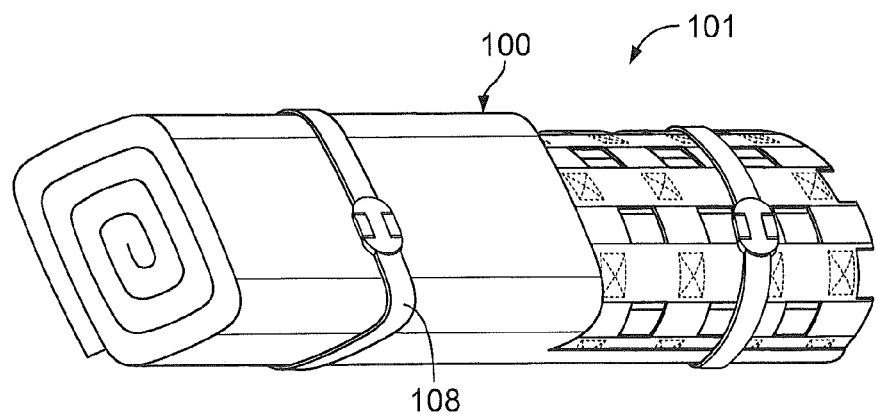

Following transport, the vehicle 50 can be disconnected from the rigging cables 30 and the protection system 101 can be disconnected from the vehicle 50. If desired, the shield 100 can be the reconfigured (e.g., folded, rolled, bundled or otherwise collapsed) in a storage portion or configuration to facilitate storage of the shield 100, as shown in FIGS. 13 and 14. An auxiliary storage or retention device, such as a bag or strap 108, may be provided to retain the shield 100 in its storage configuration.

The protection system 101 can provide a number of advantages. The shield 100 can be formed so as to be relatively lightweight and capable of being compacted for storage and transport. The porous construction of the shield 100 can reduce or minimize the amount of material necessary for adequate protection. The porosity of the shield 100 can be engineered or optimized to adequately alleviate the load incident on the windshield 59 while minimizing the weight of the shield 100. When not in use, the flexible shield 100 can be folded or otherwise reconfigured into a compact volume that consumes relatively little storage space, which is typically at a premium in operational environments. According to some embodiments, the shield 100 weighs less than 25 pounds. The storage footprint of the shield 100 and the protection system 101 can be small enough to allow for "tucked away" storage in various compartments of the vehicle 50.

The light weight and flexibility reduces the handling effort required of ground crews. In some embodiments, the system 101 is light enough (e.g., less than 25 pounds) to allow for a single ground crew personnel to carry the system 101 for storing and positioning. Ground crew effort may be reduced by the general layout and attachment features of the protection system 101. Simple ratcheting buckles can be used to secure the shield 100 at the various attachment points on the vehicle 50. For vehicles that require access to the hood area during the rigging procedure, the hood section 130 can provide improved footing and access to rigging components. The shield 100 does not restrict access to the lifting points and the protruding lifting point hardware can pass through the openings 132.

The handles 160 provide the ground crew with a secure place to brace themselves during the rigging process for greater stability while making the cable connections to the lifting eyes 60. The handles 160 can also aid the rigger when climbing up and down on the vehicle 50 to make connections.

While the protection system 101 has been depicted and described as used on a vehicle (an HMMWV), protection systems of the present invention can be adapted or configured for other types of slung loads that experience similar high speed transit failures. The protection system can be scaled or adapted (in size and/or shape) for use with many types of vehicles (e.g., tactical vehicles) or other slung loads. Various aspects, such as the front bra region 140 and the netting section 110 can be easily altered to accommodate other geometric shapes.

A further advantage of the protection system 101 is that it does not require any rigid structural components (e.g., rigid support frame or struts) to be attached to the aircraft or the slung cargo load (e.g., the vehicle 50). Instead, the protection system 101 relies on the rigidity of the slung cargo. The shape of the shield 100 (including the spaced apart windshield section 110) is maintained by membranous tension. The cargo load (e.g., vehicle) being shielded acts as a rigid structure that supports the tension in the shield 100. As a result, the protection system 101 can be more easily mounted and can be stowed more compactly.

According to some embodiments and as illustrated, the shield 100 is a single, unitary component, rather than multiple discrete panels.

With reference to FIG. 16, a protected load 202 including the vehicle 50 and a protection system 201 according to further embodiments of the invention is shown therein. The protection system 201 is constructed and used in the same manner as the protection system 101 except as discussed below. The system 201 includes a shield 200 and a mounting system 250 corresponding to the shield 100 and the mounting system 150, respectively.

The mounting system 250 is configured in the same manner as the mounting system 150 and further includes a pair of windshield section securing or tensioning straps 259. The proximal ends of the straps 259 are secured to the windshield section 210 at interior locations between the top and bottom edges 210A and 210B and between the side edges 210C. The proximal ends of the straps 259 may be secured to the shield section 210 by stitching or may be integrally formed with the shield section 210, for example. The distal ends of the straps 259 are provided with carabiners 259A or other suitable connectors. Each strap 259 may be further provided with a tightening device 259B such as a ratcheting device.

In use, the connectors 259A are secured to the lift hooks or mounting rings 60. The straps 259 may be tightened or tensioned using the tightening devices 259B. A tension load is thereby applied across the windshield section 210 by the straps 259. Alternatively, the distal ends of the straps 259 may be secured to other available hardpoints on the vehicle 50 such as the bumper, chassis, hood, etc. and the strap tension adjusted using the devices 259B as described above.

The windshield section 210 may be further stabilized and tensioned by securing straps 254, 256 and 258 corresponding to straps 154, 156 and 158, respectively.

The supporting straps 259 serve to reduce the compliance of the windshield section 210 covering the windshield 59, thereby reducing deflections of the windshield section 210 due to aerodynamic loads in high speed flight. The interior attachment points of the straps 259 create a more direct load path from the location of maximum deflection in the windshield section 210 providing more direct transfer of aerodynamic loads to the attachment points.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed:

1. A method for transporting a cargo load using a carrier aircraft, the method comprising:
   mounting a shield on the cargo load such that the shield is supported by the cargo load to form a protected load; and
   aerial transporting the protected load as a slung load from the carrier aircraft, wherein the shield serves to protect the cargo load from aerodynamic loads generated by flight of the carrier aircraft;
   wherein:
      the shield includes a section thereof perforated with a plurality of flow openings; and
      the shield permits a portion of the aerodynamic load generated by flight of the carrier aircraft to be applied to the cargo load through the flow openings.

2. The method of claim 1 wherein:
   the shield is flexible; and
   the method further includes, after aerial transporting the cargo load as a slung load:
      removing the shield from the cargo load; and thereafter
      folding, rolling and/or bundling the shield for storage.

3. The method of claim 1 wherein the collective area of the plurality of openings is in the range of from about 10 to 60% of the total area of the perforated section.

4. The method of claim 1 wherein:
   the cargo load is a vehicle including a windshield;
   the shield includes a windshield section; and
   mounting the shield on the cargo load includes mounting the shield on the vehicle such that the windshield section covers and is spaced apart from the windshield to protect the windshield from aerodynamic loads generated by flight of the carrier aircraft.

5. The method of claim 4 wherein:
   the windshield section is flexible; and
   mounting the windshield section on the vehicle includes mounting the windshield section on the vehicle such that the windshield section is held in tension across and spaced apart from the windshield.

6. The method of claim 5 wherein mounting the windshield section of the vehicle includes:
   securing the windshield section to the vehicle with straps; and thereafter
   applying a tensioning load to the straps and thereby the windshield section using a tightening device.

7. The method of claim 4 wherein:
   the vehicle includes a front grill;
   the shield includes a front bra section; and
   mounting the shield on the cargo load includes securing the bra section over the front grill.

8. The method of claim 7 wherein the bra section is a flexible panel integral with the windshield section.

9. The method of claim 4 wherein:
   the vehicle includes a hood;
   the shield includes a hood section; and
   mounting the shield on the cargo load includes securing the hood section over the hood.

10. The method of claim 9 wherein the hood section is a flexible panel integral with the windshield section.

11. The method of claim 1 wherein the shield includes at least one integral grab handle.

12. The method of claim 1 wherein mounting the shield on the cargo load includes securing the shield to the cargo load using flexible straps secured to the cargo load at selected attachment points on the cargo load.

13. The method of claim 12 including applying a tension load to the shield on the cargo load using a tightening device.

14. A method for transporting a cargo load using a carrier aircraft, the method comprising:
   mounting a shield on the cargo load such that the shield is supported by the cargo load to form a protected load; and
   aerial transporting the protected load as a slung load from the carrier aircraft, wherein the shield serves to protect the cargo load from aerodynamic loads generated by flight of the carrier aircraft;
   wherein:
      the cargo load is a vehicle including a windshield;
      the shield includes a windshield section;
      mounting the shield on the cargo load includes mounting the shield on the vehicle such that the windshield section covers and is spaced apart from the windshield to protect the windshield from aerodynamic loads generated by flight of the carrier aircraft;
      the windshield section is perforated with a plurality of flow openings; and
      the windshield section permits a portion of the aerodynamic load generated by flight of the carrier aircraft to be applied to the windshield through the flow openings.

15. A protection system for protecting a cargo load during exposed aerial transport, the protection system comprising:
   a shield adapted to be mounted on the cargo load such that the shield is supported by the cargo load to form a protected load;
   wherein, when the protected load is aerially transported as a slung load from a carrier aircraft, the shield will serve to protect the cargo load from aerodynamic loads generated by flight of the carrier aircraft;
   wherein:
      the shield includes a section thereof perforated with a plurality of flow openings; and
      the shield permits a portion of the aerodynamic load generated by flight of the carrier aircraft to be applied to the cargo load through the flow openings.

16. The protection system of claim 15 wherein the shield is flexible.

17. The protection system of claim 15 wherein the collective area of the plurality of openings is in the range of from about 10 to 60% of the total area of the perforated section.

18. The protection system of claim 15 wherein:
   the shield includes a windshield section; and
   the shield is adapted to be mounted on the vehicle such that the windshield section covers and is spaced apart from a windshield of the vehicle to protect the windshield from aerodynamic loads generated by flight of the carrier aircraft.

19. The protection system of claim 18 wherein the windshield section is flexible.

20. The protection system of claim 18 wherein:
   the windshield section is perforated with a plurality of flow openings; and
   the windshield section permits a portion of the aerodynamic load generated by flight of the carrier aircraft to be applied to the windshield through the flow openings.

21. The protection system of claim 18 wherein the shield further includes a front bra section adapted to be secured over a front grill of the vehicle.

22. The protection system of claim 21 wherein the bra section is a flexible panel integral with the windshield section.

23. The protection system of claim 18 wherein the shield further includes a hood section adapted to be secured over a hood of the vehicle.

24. The protection system of claim 23 wherein the hood section is a flexible panel integral with the windshield section.

25. The protection system of claim 15 wherein the shield includes at least one integral grab handle.

26. The protection system of claim 15 including a plurality of flexible straps configured to secure the shield to the cargo load at selected attachment points on the cargo load.

27. The protection system of claim 26 including at least one integral tightening device configured to apply a tension load to the shield on the cargo load.

* * * * *